Oct. 14, 1952 H. CHIREIX 2,614,245
PHASE MODULATION APPARATUS
Filed April 6, 1950

INVENTOR
Henri CHIREIX
By
Agent

Patented Oct. 14, 1952 2,614,245

UNITED STATES PATENT OFFICE 2,614,245

PHASE MODULATION APPARATUS

Henri Chireix, Paris, France, assignor to Societe Francaise Radio-Electrique, a corporation of France Application April 6, 1950, Serial No. 154,279
In France April 20, 1949

2 Claims. (Cl. 332—16)

Figure 1:
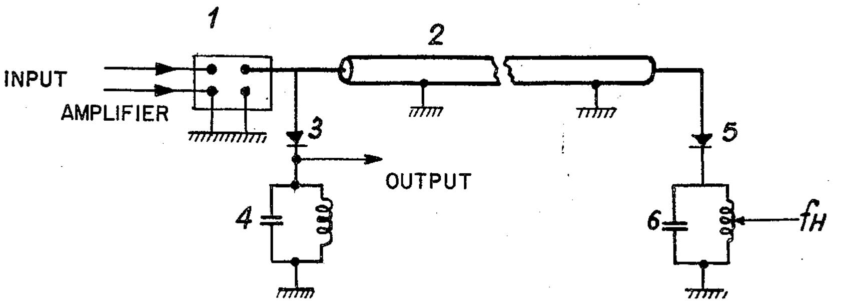

My invention relates to receivers intended for receiving multiplex transmissions which are based on the technique of carrier currents and phase modulation.

According to this well known technique, the speech bands which have been transposed in the frequency scale frequency-modulate a transmitter but in such a manner that the mean frequency deviation of a channel is proportional to the mean frequency of the modulating currents of said channel.

Owing to this fact, the phase deviation remains constant irrespective of the channel considered and the frequency deviation allotted to the channel operating on the highest frequency is much greater than that allotted to the channel operating on the lowest frequency.

The discriminator, which is adapted to convert the frequency-modulation into amplitude-modulation and which in general has a linear relation between the amplitude and the frequency, is thus much more heavily "loaded" by the upper range channels than by the lower range channels and this may produce a high degree of diapony on the lower range channels if the characteristic of the frequency discriminator is not absolutely linear.

The object of my invention is to overcome this defect by automatically more or less equalizing the deviation of frequency to be discriminated for all the channels. This result is obtained by actuating a frequency-changer, which is for example incorporated in or preferably placed after the intermediate-frequency circuits of the receiver, on the one hand by means of a voltage at that intermediate frequency and on the other hand by means of a second voltage at a frequency which is derived from the first by conversion and which has undergone a delay $\tau$; the wave produced by this frequency-change has a frequency deviation which is substantially doubled for the lowest frequencies of modulation with respect to which the delay $\tau$ has little effect.

In order to make the object and the purpose of the invention clearer, consider for example a multiplex system with 100 channels which are spaced 4 kilocycles apart from one another and which start at 100 kilocycles, the transposition frequency of the channel of lowest frequency, and extend to 500 kilocycles, the transportation frequency of the channel of highest frequency. The frequency deviation will in this case be for example $\pm 100$ kilocycles for the lowest frequency channel and $\pm 500$ kilocycles for the highest frequency channel, the phase deviation thus being $$\frac{100}{100}=\frac{500}{500}=1 \text{ radian}$$

irrespective of the channel considered. According to the usual technique the discriminator would operate on $\pm 500$ kilocycles of its characteristic for the channel of highest frequency and only on $\pm 100$ kilocycles for the channel of lowest frequency, thereby causing a risk of diaphony occurring on the channels of lowest frequency if the characteristic is not absolutely linear. According to the invention, the frequency deviation is equalized at about $\pm 200$ kilocycles at the location of the discriminator irrespectve of the order of frequency of the channel.

Figure 2:
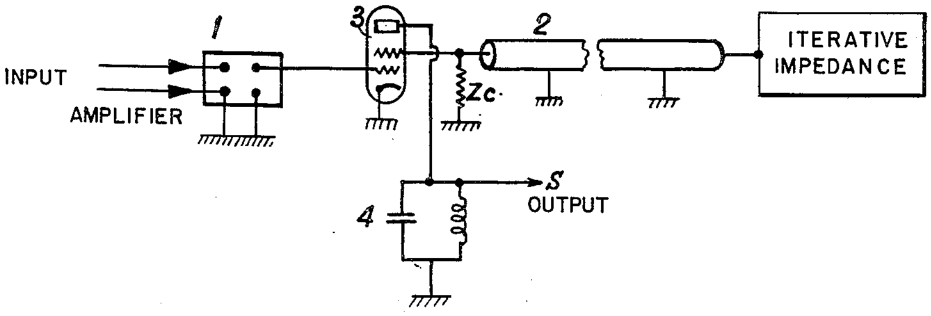

The simplest means of effecting this is to constitute the frequency-changer by a simple detector which is connected in parallel to the output of the intermediate-frequency stages and is excited by same and by the echo reflected on a different frequency, of an unmatched retardation line, the delay of which is $$\frac{\tau}{2}$$

and which is also connected in parallel to the output terminals of the intermediate-frequency stages. The invention will be described in this simplified form, reference being had to the accompanying drawing in which Fig. 1 shows one embodiment of the invention and Fig. 2 a modification of construction, the same reference numerals denoting similar elements. In Fig. 1 the intermediate-frequency amplifier is shown at 1; 2 represents an unmatched retardation line that has a delay of $$\frac{\tau}{2}$$

3 is the frequency-changer that supplies the output circuit 4. S indicates diagrammatically the coupling to the following stages of the receiver. Finally, 5 represents another frequency-changer and 6 a circuit tuned to the heterodyning frequency $fH$.

The device operates as follows: let $f_s$ denote the mean value of the intermediate frequency and $f_s+\Delta f_t=f$ its instantaeous value. $\Delta f_t$ is the frequency deviation as a function of the time, its being possible for $\Delta f_t$ to have positive or negative values.

The wave of frequency $f=f_s+\Delta f_t$ will travel through the line 2 in a time $$\frac{\tau}{2}$$

and will be reflected at the end. If nevertheless the mixer 5 is excited by a heterodyne frequency $f_h$, this reflection may be either in phase or in phase opposition according to whether the resistance referred to the end of the line is higher or lower than the characteristic impedance. Consequently a modulation is effected of the wave of frequency $f$. This modulated wave again travels through the line towards the amplifier 1 which it reaches after the time $$\frac{\tau}{2}$$

so that the frequency-changer 3 is also subjected to the action of said wave.

By suitably choosing the time-origin, it will be possible to write: for the direct wave at the output terminals of the intermediate frequency:

$$f_s+\Delta f\left(t+\frac{\tau}{2}\right)$$

for the wave at the end of the line a complex wave which comprises the frequencies $f_s+f_t-f_h$; $f_s+f_t+f_h$; $f_h$ and $f_s+\Delta f_t$.

If the retardation line is constituted in the simplest form by a section of cable of great length, the different frequencies will be variously attenuated during their return travel. Consider the first of these frequencies; it interferes in the frequency-changer 3, so as to give it a component of frequency:

$$\left[f_s+\Delta f\left(t+\frac{\tau}{2}\right)\right]+\left[f_s+\Delta f\left(t-\frac{\tau}{2}\right)-f_h\right]=$$

$$(2f_s-f_h)+\Delta f\left(t+\frac{\tau}{2}\right)+\Delta f\left(t-\frac{\tau}{2}\right)$$

which will be collected in the wide-band circuit 4 which is tuned to the mean frequency: $2f_s-f_h$.

By suitably choosing the values, the other components, even if they are not sufficiently attenuated, will produce distinctly different frequencies. It can be seen that for the original frequency deviation $\Delta f_t$ the frequency variation $$\Delta f\left(t+\frac{\tau}{2}\right)+\Delta f\left(t-\frac{\tau}{2}\right)$$

has been substituted. For a sinusoidal modulation at the pulsation $\Omega$ which corresponds to the frequency $$\frac{\Omega}{2\pi}$$

and the amplitude of which is $\Delta f_0$, there is thus obtained:

$$\Delta f_0\left[\sin \Omega\left(t+\frac{\tau}{2}\right)+\sin \Omega\left(t-\frac{\tau}{2}\right)\right]=2 \cos \frac{\Omega\tau}{2} \sin \frac{\Omega\tau}{2}$$

or $$2\Delta f_0 \cos \Omega F\tau \sin \Omega t$$

F being the modulation frequency.

This equation enables $\tau$ to be determined and consequently the length of the retardation line. Thus, in the example given, it is possible to take $\theta=80°$ for the angle that corresponds to the maximum transposition frequency, which will give $2 \cos \pi F_{max}\tau=0.35$, whereas for the minimum transposition frequency $\theta=16°$, which will give $2 \cos \pi F_{min}\tau=1.93$.

As a result of this on the other hand $\tau=0.9$ microsecond, i. e. a retardation line having a delay of 0.45 microsecond. Still referring to the example considered, the frequency deviation at S will be 193 kilocycles for the lowest channel and 175 kilocycles for the highest channel instead of the original 100 kilocycles and 500 kilocycles.

It would appear, according to Equation 1, that it is possible to make $f_h=0$, i. e. in short, eliminate 5 and 6 and short-circuit the line or leave its circuit open, but this is not so, since in this case although the output frequency:

$$2f_s+\left[\Delta f\left(t+\frac{\tau}{2}\right)+\Delta f\left(t-\frac{\tau}{2}\right)\right]$$

would be obtained, the frequency $$2f_s+2\Delta f\left(t-\frac{\tau}{2}\right)$$

would also be obtained by the effect of doubling the incoming frequency alone in the frequency-changer.

In a modification of construction (Fig. 2), a hexode tube is provided at 3 that has two grids with linear characteristics, to one of which is directly fed the intermediate frequency obtained from 1 and to the other of which is connected the end of a retardation line, the delay of which is $\tau$ and the other end of which is in this case preferably connected to its iterative impedance so as actually only to retain the frequency-change terms.

Of course, the diagrams of the figures are simplified theoretical diagrams. In particular it may be advantageous to arrange between the end of the line 2 and the modulator 5, 6 a quarter-wave element on the frequency $f_s$ of suitable characteristic impedance, said element acting as an impedance reverser, in order to "match" the modulator 5 with the line 2. It may also be necessary to insert, in series with the line 2 or in the line 2, a filter that allows the desired waves to pass and eliminates the unwanted waves.

What I claim is:

1. The method for converting a sinusoidally frequency-modulated wave into another wave that has a different carrier frequency and a different frequency deviation, which comprises subjecting the wave to be converted to a first delay of a predetermined value $$\frac{\tau}{2}$$

mixing it with oscillations of fixed frequency, subjecting the wave obtained by said mixing to a second delay equal to the first, then mixing it with the wave to be converted and frequency-modulating, the wave obtained by this latter mixing with a deviation equal to the product of the original deviation by $2 \cos \pi F\tau$, F being the modulation frequency.

2. An arrangement for converting a sinusoidally frequency-modulated wave into another wave that has a different carrier frequency and a different frequency deviation, comprising in combination, a retardation line of high dielectric losses which is adapted to receive at one of its ends the wave to be converted and is connected at its other end to a source of fixed frequency oscillations so as to subject said wave to be converted to a frequency-change and reflect it towards its starting point, and means for mixing at said starting point the retarded wave of changed frequency with the wave to be converted so as to produce a new frequency-modulated wave with a deviation equal to the product of the original deviation by $2 \cos \pi F\tau$, F being the modulation frequency and $\tau$ twice the delay of said line.

HENRI CHIREIX.

REFERENCES CITED

The following references are of record in the file of this patent:

UNITED STATES PATENTS

| Number | Name | Date |
|---|---|---|
| 2,346,800 | Usselman | Apr. 18, 1944 |